United States Patent [19]
Vitzthum et al.

[11] Patent Number: 4,490,431
[45] Date of Patent: Dec. 25, 1984

[54] 0.1 MICRON RATED POLYPROPYLENE MEMBRANE AND METHOD FOR ITS PREPARATION

[75] Inventors: Gunter H. Vitzthum, Candler; Michael A. Davis, Asheville, both of N.C.

[73] Assignee: Akzona Incorporated, Enka, N.C.

[21] Appl. No.: 438,823

[22] Filed: Nov. 3, 1982

[51] Int. Cl.³ .................. B32B 3/00; B29D 27/04
[52] U.S. Cl. ................................ 428/220; 264/41; 264/49; 428/315.7
[58] Field of Search ........... 428/315.5, 220, 315.7; 264/41, 49

[56] References Cited
U.S. PATENT DOCUMENTS

| | | | |
|---|---|---|---|
| 3,426,754 | 2/1969 | Bierenbaum et al. | 428/315.5 |
| 3,679,540 | 7/1972 | Zimmerman et al. | 428/316.6 |
| 4,247,498 | 1/1981 | Castro | 264/41 |

Primary Examiner—William J. Van Balen
Attorney, Agent, or Firm—Francis W. Young; Jack H. Hall

[57] ABSTRACT

There is disclosed a substantially skinless microporous polypropylene membrane characterized by having
(a) a bubble point of about 25 to about 50 psi;
(b) a thickness of about 3 to about 7 mils;
(c) a nitrogen flow rate of at least 0.5 liters per square centimeter-minute;
(d) a burst strength of at least 10 psi; and
(e) an S value of about 15, or less.

There is also disclosed a method of preparing a microporous polypropylene membrane comprising heating a mixture of about 30 percent polypropylene and about 70 percent, N,N-bis(2-hydroxyethyl)tallowamine, by weight, to a temperature and for a time sufficient to form a homogeneous solution, casting or extruding said solution at a thickness of about 3 to about 7 mils, onto a chill roll maintained at a temperature of from about 50° to about 80° C., allowing said solution to solidify on said chill roll to form a solid sheet, removing said solid sheet from said chill roll and removing at least a substantial portion of the liquid from said sheet to form the microporous polypropylene membrane.

11 Claims, 26 Drawing Figures

0.1 MICRON RATED POLYPROPYLENE MEMBRANE AND METHOD FOR ITS PREPARATION

BACKGROUND OF THE INVENTION

This invention relates to a microporous polypropylene membrane, in particular to such a membrane having a pore-size rating of 0.1 micron, and to a method for its preparation.

Microporous polypropylene membranes have existed in the art for many years, made by various methods. Of particular interest is the method described in U.S. Pat. No. 4,247,498 for making microporous products, including microporous polypropylene membranes.

Heretofore microporous polypropylene membranes having a pore-size rating of 0.2 microns have existed which have exhibited suitable physical properties. However, for certain applications it is necessary and/or desirable to use polypropylene membranes having an even smaller pore-size rating, such as 0.1 micron. Past efforts to develop a 0.1 micron polypropylene membrane have not been successful. Previous attempts to produce such a membrane have resulted in membranes which either do not meet the pore-size requirement or which do meet the pore-size requirement, but suffer from other physical problems, such as low burst strength or poor flow rate characteristics.

Thus, there has existed a need in the art for a microporous polypropylene membrane having a pore-size rating of 0.1 micron, while being capable of maintaining a good flow rate, as well as possessing other desirable physical properties.

SUMMARY OF THE INVENTION

There has now been unexpectedly discovered a substantially skinless microporous polypropylene membrane having a pore-size rating of 0.1 micron and possessing advantageous physical properties. The membrane is characterized by having:

(a) a bubble point of about 25 to about 50 psi;
(b) a thickness of about 3 to about 7 mils;
(c) a nitrogen flow rate of at least 0.5 liters per square centimeter-minute;
(d) a burst strength of at least 10 psi; and
(e) an S value of about 15, or less There has also been discovered a method of preparing a microporous polypropylene membrane comprising heating a mixture of about 30 percent polypropylene and about 70 percent, N,N-bis(2-hydroxyethyl)tallowamine, by weight, to a temperature and for a time sufficient to form a homogeneous solution, casting or extruding said solution at a thickness of about 3 to about 7 mils, onto a chill roll maintained at a temperature of from about 50 to about 80° C., allowing said solution to solidify on said chill roll to form a solid sheet, removing said solid sheet from said chill roll and removing at least a substantial portion of the liquid from said sheet to form the microporous polypropylene membrane.

DETAILED DESCRIPTION OF THE PREFERRED EMBODIMENT

Bubble Point/Maximum Pore Value

As indicated, the present invention provides a microporous polypropylene membrane which has a unique combination of properties, as contrasted with typical prior art polypropylene membranes.

The bubble point is of primary significance in characterizing the membrane of the present invention. When used in this application the term "bubble point" means the bubble point determined with isopropyl alcohol. From the analytically determined bubble point, one may calculate a maximum pore-size value for the membrane. The maximum pore size value is directly related to the rated pore-size of the membrane. For a 0.1 micron rated membrane, the maximum pore-size value should be from about 0.2 micron to about 0.4 micron, with about 0.3 micron being most typical. This translates to a bubble point of from about 50 psi to about 25 psi, with about 30 psi being typical. By contrast for a 0.2 micron rated membrane, the maximum pore-size value should be about 0.4 micron to about 0.65 micron, preferably about 0.5 micron to about 0.6 micron.

Figure 7:
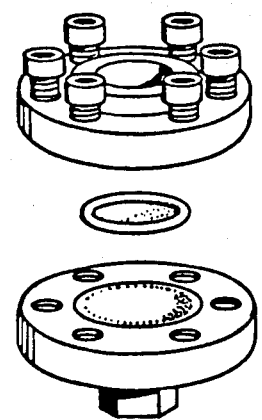
FIG. 7 is a diagram of a test filter holder used in a bubble point testing apparatus.

To determine the bubble point for a membrane the following technique is employed (adapted from ASTM method F 316). The necessary apparatus and reagents are:
1. Isopropyl alcohol, ACS reagent grade.
2. Test filter holder consisting of a 47-mm high-pressure stainless steel filter holder (Millipore Cat. No. XX45-047-00 or equivalent) with a 3.50-cm opening machined in the top half and 47-mm downstream support screen (Millipore XX42-047-09 or equivalent); see FIG. 7.
3. Stainless steel forceps with smooth rounded tips, Millipore XX62-000-06 or equivalent.
4. Mirror-backed test gauges, 0–30 psi and 0–100 psi.
5. Pressure regulator, Bellofram Type 10-B, 2–120 psi (or other appropriate range) or equivalent.
6. 3-way ball valve; other valves, fittings, and tubing as required.
7. 47-mm arch punch and hammer.
8. Petri dish or other liquid container.
9. Source of clean compressed nitrogen.
10. Lighted magnifier.

Figure 8:
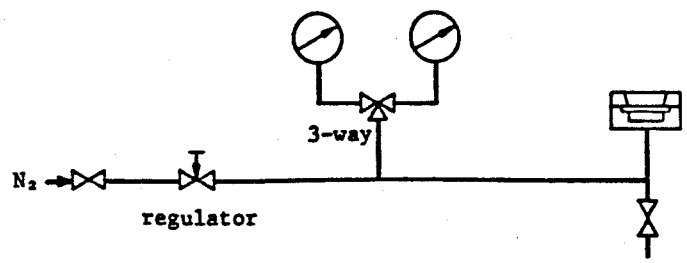
FIG. 8 is a diagram of an apparatus used to measure bubble point.

The procedure is as follows:
1. Assemble the apparatus as shown in FIG. 8.
2. Set the nitrogen supply pressure to the apparatus at ~10 psi above the expected bubble point or 100 psi.
3. Using the punch, cut five 47-mm discs across the width of the sample.
4. Soak each disc in isopropyl alcohol in the petri dish for 15 seconds or until completely wet.
5. With the forceps, place the wet filter disc on the lower half of the filter holder with the dull side of the disc facing down. Put a few drops of isopropyl alcohol on the disc, then add the support screen (side with large holes in contact with the disc) and the top half of the filter holder. Tighten the bolts securely.
6. Pour isopropyl alcohol into the reservoir formed by the hole in the top half of the filter holder to a depth of ~1 cm.
7. Select the 0–30 psi gauge with the 3-way valve.
8. Observe the disc through the magnifier while slowly increasing the pressure until the first steady stream of small bubbles is observed rising through the isopropyl alcohol. Record the pressure (to 0.1 psi) at which bubbles appear. The stream of bubbles which marks the bubble point should come from the center portion of the disc instead of the edges where the disc is clamped.
9. If bubbles have not been observed when the pressure is at 27–28 psi, change the 3-way valve to the 0–100 psi gauge to continue increasing the pressure.
10. After the bubble point has been recorded, reduce the pressure with the regulator and turn off the nitrogen supply to the apparatus.
11. Vent the filter holder by opening the valve at the bottom of the holder.
12. Remove the isopropyl alcohol from the reservoir with a pipette.
13. Disassemble the holder, remove the filter disc and inspect it for obvious holes or defects. Note any defects found.
14. Continue testing as required.
15. Calculate the maximum pore diameter according to the equation $d(\mu m) = 0.415 \, \gamma/BP \, (psi)$, where $\gamma$ = surface tension in dynes/cm. For isoproypl alcohol, the equation reduces to $d(\mu m) = 9.02/BP \, (psi)$, for temperatures of 20°–25° C.

Thickness

As stated previously, the thickness of the membranes of the present invention is from about 3 to about 7 mils, preferably from about 3.5 to about 4 mils. To determine the thickness, the necessary apparatus is a Starret No. 1015A-431 portable dial hand gauge. This gauge with ¼" diameter presser foot exerts a pressure of 2.5 psi (+/−10%) on the sample during a measurement. The procedure is as follows:
1. Using the adjustment screw on the dial gauge, adjust the gauge to read zero when no sample is being measured.
2. With the lever, raise and lower the presser foot several times to check that the reading returns to zero each time.
3. Raise the presser foot and slip the sample between the foot and base plate.
4. Lower the presser foot onto the sample gently and read the thickness, estimating to 0.1 mil.
5. Test the sample thickness at five locations across the full width of the membrane sample.

The thickness of the membranes of the present invention is similar to the thickness of prior art 0.2 micron rated membranes which typically have a thickness of about 6 to about 7 mils.

Burst Strength

As a practical limitation, a membrane must have the ability to withstand normally encountered processing conditions which usually require that the membrane have a burst strength of at least 10 psi, preferably at least 15 psi. The necessary apparatus to determine burst strength is:
1. 13-mm Swinney membrane filter holder, Millipore SX00-013-00 (no support screen), or equivalent, with outlet enlarged to ≧7 mm diameter.
2. Regulator, range 2–60 psi; Bellofram type 10-B, or equivalent.
3. Test gauge, 0–30 psi with maximum pointer, Ashcroft Type 1009S, or equivalent.
4. Stainless steel forceps with smooth rounded tips, Millipore XX62-000-06, or equivalent.
5. Source of clean compressed nitrogen.
6. 13-mm punch and hammer.

Figure 9:
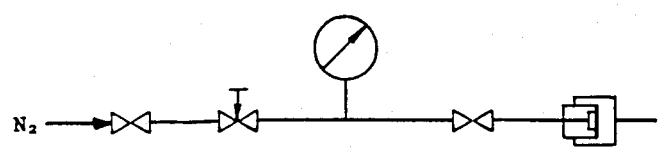
FIG. 9 is a diagram of an apparatus used to measure burst strength.

The procedure is as follows:
1. Set up the apparatus as in FIG. 9.
2. Cut five 13-mm discs across the width of the film, being careful to avoid including obviously defective areas of the film in the samples.
3. Using forceps, insert the disc between the two gaskets of the Swinney cell and screw the cell together tightly. If the film surfaces are different in appearance, place the film in the cell with the dull side toward the gas inlet.
4. Set the maximum pointer on the gauge to zero.
5. Turn on nitrogen and slowly increase the pressure until the membrane bursts.
6. Turn off the nitrogen and reduce the pressure.
7. Read and record the maximum pressure, to 0.1 psi. Reset maximum indicator to zero.
8. Remove the ruptured disc from the cell and examine. If the rupture is not the typical star-type burst, note that fact, and test an additional disc.

The burst strength of a typical 0.2 micron rated polypropylene membrane is also usually above 10 psi.

Nitrogen Flow Rate

In order for any membrane to be useful, it must not only be effective in removing any material present which is larger than a given size, such as 0.1 micron, it must also be capable of accomplishing such a filtration within a reasonable length of time. One way to project the anticipated filtration rate which may be obtained by using a given membrane is by determining the nitrogen flow rate for the membrane. A high nitrogen flow rate is usually indicative of a structure that has a low resistance to fluid passage, thus making such a membrane desirable for filtration provided that all of the other physical characteristics are suitable. Membranes of the present invention have a nitrogen flow rate of at least 0.5, and preferably at least 0.7, liters per square centimeter-minute.

The necessary apparatus to determine nitrogen flow rate is:

1. Filtered (0.45 $\mu$m or 0.2 $\mu$m) nitrogen at 30-50 psi.
2. Pressure regulator, Bellofram type 10B, 2-25 psi, or equivalent.
3. Pressure gauge, 0-30 psi.
4. Millipore stainless steel high pressure 47-mm filter holder, Cat. No. xx45-047-00, or equivalent.
5. Filter forceps with unserrated tips, Millipore XX62-000-06, or equivalent.
6. Magnehelic 0-20 psi differential pressure gauge, Dwyer Instruments Cat. No. 2220, or equivalent.
7. One or more flow meters of appropriate capacity (Matheson type 605 with stainless steel float is standard; different tubes and floats may be required for very high or low flows).

Figure 10:
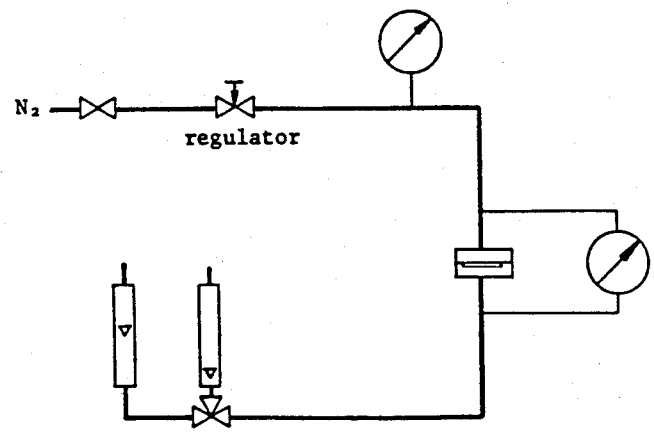
FIG. 10 is a diagram of an apparatus used to measure nitrogen flow rate.

The procedure is as follows:

1 Set up the apparatus as shown in FIG. 10.
2. Using the arch punch, cut five 47-mm discs from each membrane sample to be tested.
3. Using forceps, place the disc in the filter holder with the dull side upstream. Put the top half of the filter holder in place and tighten securely.
4. Open valve B to the desired flow meter (is more than one).
5. Open valve A to admit nitrogen to the apparatus.
6. With the regulator, adjust the pressure to 10 psi on the Magnehelic gauge.
7. Read the flow meter at the middle of the ball and record. If the first is in the bottom or top 10% of the tube, switch to a higher or lower range flow meter if available.
8. Close valve A, disassemble the filter holder and remove the membrane filter. Install the next disc and continue testing.

Sharpness

Another means of characterizing the membranes of the present invention is by a sharpness factor, "S". The S factor is determined by analyzing a mercury intrusion curve for the given membrane. All mercury intrusion data discussed in this application was determined by use of a Micromeritics Mercury Penetration Porosimeter, Model 910 series. The S value is defined as the ratio of the pressure at which 85 percent of the mercury penetrated to the pressure at which 15 percent of the mercury penetrated. This ratio is a direct indication of the variation in pore diameter across the central 70 percent of the pores in any given sample, as pore diameter is equal to 176.8 divided by the pressure in psi.

The S value, then, is a ratio of the diameter of the pores at which 15 percent of the mercury has intruded to the diameter of the pores at which 85 percent of the mercury has intruded. The range for 1 to 15 percent and 85 to 100 of mercury intrusion is ignored in determining the S factor. The range from 0 to 15 percent is ignored as penetration in this range may be due to cracks introduced into the material as a result of the freeze-fracturing to which the material was subjected prior to performing the mercury intrusion study. Also, the range from 85 to 100 percent is ignored as data in such a range may be due to compression of the sample rather than to actual penetration of the mercury into the pores.

Characteristic of the range of pore sizes exhibited by the membranes of the present invention, the usual S value for such structures is usually less than about 15 and thus is in the range of from about 1 to 15, with a range of about 8 to 14 being typical, and a value of about 11 being representative.

Pore-Size Distribution

The S value previously discussed is one method for analyzing the uniformity of the porosity within a membrane, based upon mercury intrusion data. Another method for analyzing the nature of a membrane's porosity is through the use of a pore-size distribution analyzer. One such analyzer was developed by Gelman Instrument Company and is described in Membranes Science and Technology, C. T. Badenhop, et al, J. E. Flynn, Ed., Plenum Press (N.Y., 1970), pages 120-138) and results are discussed by T. H. Meltzer and J. C. Marshall in the Bulletin of the Parenteral Drug Association, Volume 30, No. 5, 1976, pages 214-225. An electronic analog of the pneumatic pore-size distribution analyzer developed by Gelman Instrument Company has been constructed and is described further below, as well as the methodology for its use.

The electronic pore-size distribution analyzer generates a pore-size distribution by electronically differentiating the ratio of the nitrogen flow rate through a wetted membrane to the nitrogen flow rate through a dry membrane with respect to time as a function of linearly increasing pressure. For each determination, two 25-mm filter discs are cut from a sample of membrane. One disc is placed dry in a stainless steel filter holder and the other disc is with silicone oil (GE SF 96-20, $\gamma = 25.4$ dynes/cm) and placed in an identical stainless steel filter holder. Nitrogen gas from a regulated cylinder is simultaneously flowed through the two membranes under pressure, the same pressure being simultaneously applied to each membrane. The nitrogen flow through each membrane is monitored by an electronic mass flowmeter on the downstream side of each filter.

The nitrogen pressure is increased linearly from 10 psi to approximately 240 psi by means of a voltage ramp applied to a servo motor that controls the nitrogen pressure regulator. The signals from the mass flow meters are fed to an electronic analog divider, where the wet flow is by the dry flow. The flow ratio is then differentiated with respect to time by a Perkin-Elmer First Derivative Computer (Model FDC-1). The differentiated flow ratio is fed to the y-axis of an x-y plotter, and the pressure signal is fed to the x-axis of the x-y plotter to produce a plot of the pore-size distribution.

The y-axis of each distribution gives the relative number of pores of a given diameter. The x-axis of each distribution represents the transmembrane pressure (equal to the applied pressure in psig) which is related to the pore diameter. Pore diameters are calculated from the corresponding transmembrane pressures and the surface tension of the silicone oil used to wet the membranes by means of the LaPlace equation for straight cylindrical capillaries. This is the same equation used to calculate the maximum pore diameters from bubble point measurements.

The distribution is recorded only on the top half of the chart paper. The distribution represents the "flow pore" distribution of the membrane pores rather than the dimensional pore-size distributions. The actual pore dimensions are not measured directly, but rather the volumes of silicone oil flowed through the pores. In general, the flow pore distribution is skewed in the direction of the larger pores relative to the dimensional pore distribution.

Scanning Electron Photomicrographs

Figure 2A:
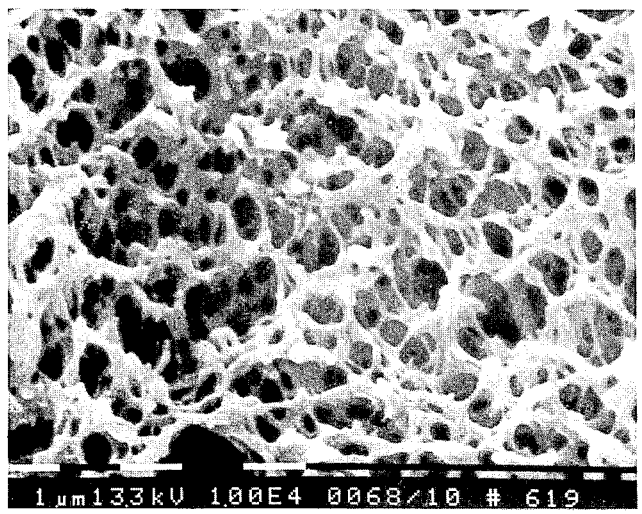
FIGS. 2A, B, C, and D are scanning electron photomicrographs of a membrane of the present invention at magnifications of 10,000, 500, 2,000, and 2,000, respectively.
Figure 3A:
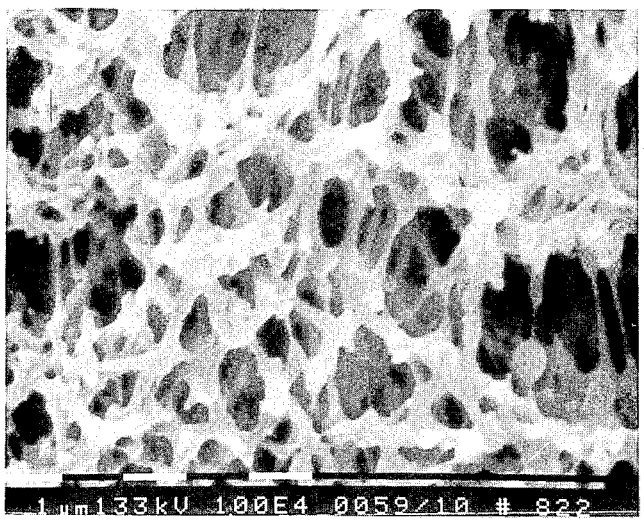
FIGS. 3A, B, C, and D are scanning electron photomicrographs of a 0.2 micron polypropylene membrane of the prior art, at magnifications of 10,000, 500, 2,000, and 2,000, respectively.

One further way to compare the porosity of membranes of the present invention to that of prior art membranes, is through the use of scanning electron photomicrographs (SEM's). FIG. 2A is an SEM of a membrane of the present invention at a magnification of 10,000 whereas FIG. 3A is an SEM of a 0.2 micron membrane of the prior art, also at a magnification of 10,000. By comparing the two figures, it is apparent that the membranes of the present invention possess a smaller average pore-size.

PROCESS DETAILS

The process of the present invention is based upon the process described in U.S. Pat. No. 4,247,498, which process is described in the art as a thermally fnduced phase separation process. To apply the method of U.S. Pat. No. 4,247,498 for the production of membranes, such as those rated 0.2 microns, a batch operating system has been employed in the art.

Figure 1:
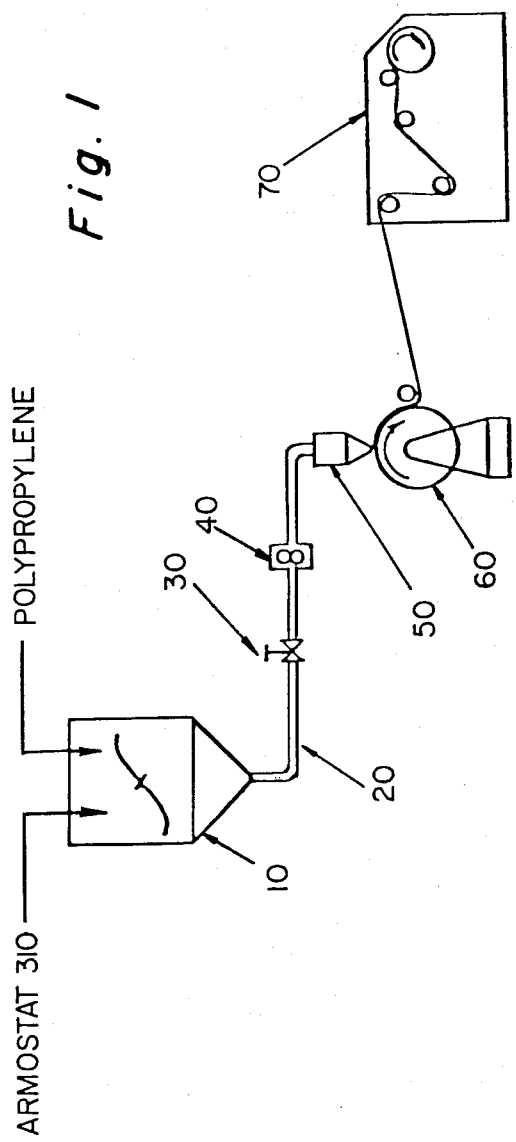
FIG. 1 is a diagram of an apparatus for carrying out the method of the present invention and for making a membrane within the scope of the present invention.

FIG. 1 shows a typical configuration for the batchwise production of membranes. In FIG. 1, N,N-bis(2-hydroxyethyl)tallowamine, such as that sold by Armak Company, Chicago, Ill., under the trademark Armostat ® 310, is introduced into mixing tank 10, which is connected to casting box 50 through conduit 20. A valve 30 and a pump 40 are usually located along conduit 20. The mixing tank is heated by any convenient means and the temperature of the amine is raised to about 200° C. Polypropylene, as sold by Phillips Petroleum Company, type No. BP-145, MFR 9.5, usually in the form of chips, is introduced into the mixing tank, in an appropriate weight ratio of amine to resin. The mixture is maintained at about 200° C. for about 1.5 hours during which time the polymer dissolves in the amine, forming a homogeneous solution. After said solution has been formed, the solution is pumped into casting box 50 through which the solution flows at an appropriate rate to cast a layer on chill roll 60 having a thickness of about 3 to about 7 mils. The space between the chill roll and the lip on the casting box can be adjusted and determines the film thickness. Instead of the casting box, an extruder and die-head may be used to extrude a layer onto the chill roll.

The chill roll temperature is typically at a temperature of about 75° C. when one is making a 0.2 micron rated membrane and rotates at a surface speed of about 15 feet per minute. When the solution contacts the chill roll cooling has started and by the time the solution reaches a temperature of about 170°–180° C., phase separation occurs. Upon further cooling, the polypropylene After the solidification has occurred, the solid film is removed from the chill roll 60 via a take-up system 70.

When the foregoing system is employed to manufacture membranes within the scope of the present invention, approximately 28 pounds of N,N-bis(2-hydroxyethyl)tallowamine is mixed with about 9.3 pounds of polypropylene in mixing tank 10. The pump 40, conduit 20 and casting box 50 are maintained at 200° C. by any suitable means. The chill roll 60 is maintained at about 60° C. and is rotated at a surface speed of about 15 feet per minute.

It is often desirable to treat the solidified film, after winding into a roll, by submerging the roll in a bath of N,N-bis(2-hydroxyethyl)tallowamine, maintained at a temperature of about 135° C. for about 3 hours.

Any suitable means may be employed to extract the amine from the solidified film, as by soaking in consecutive baths of isopropyl alcohol, to achieve an amine level of less than 0.2 percent in the final membrane.

GENERAL

From the foregoing description it should be apparent that several aspects of the present process are critical. The ratio of the weight of amine to the weight of polypropylene is critical, as further reduction in the amount of polypropylene may result in a membrane with poor mechanical properties, such as a low burst strength. If the amount of polypropylene is increased, the result may be unacceptable nitrogen and/or water flow rates.

The cooling rate of the solution of amine and polypropylene is critical inasmuch as a rapid cooling rate generally produces a smaller pore-size, and a slower cooling rate results in a larger pore size. As the cooling rate is simply related to the length of time it takes the solution to solidify after the phase separation has occurred, the primary tool in controlling the cooling rate is the temperature of the chill roll. However, if the temperature of the chill roll is too low, the result will be a substantial formation of skin on the membrane side in contact with the chill roll surface.

A skin is simply a region which has an apparent polymer density different from that of the remainder of the membrane. For example, often times a skin having an apparent density much higher than that of the remainder of the membrane may be formed. When a very low chill roll temperature is used, the skin may extend from the surface of the membrane in contact with the chill roll, across 20 percent, or more, of the cross-section of the membrane. It would not be unusual to have the skin extend throughout even 30 to 50 percent of the membrane cross-section, and more, if an inappropriate chill roll temperature is employed.

Figure 3B:
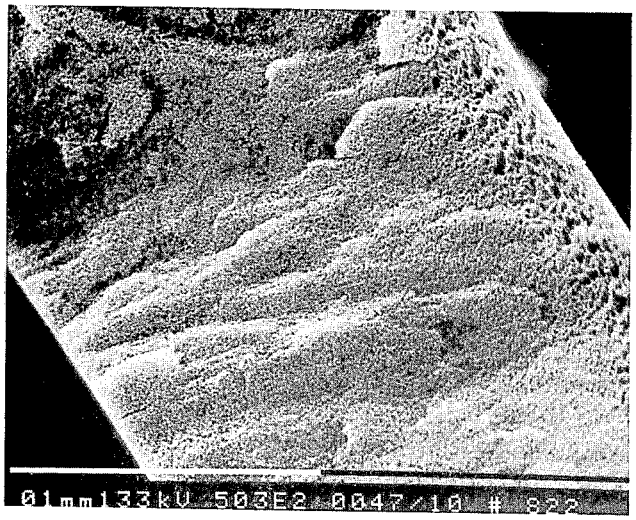
Figure 3C:
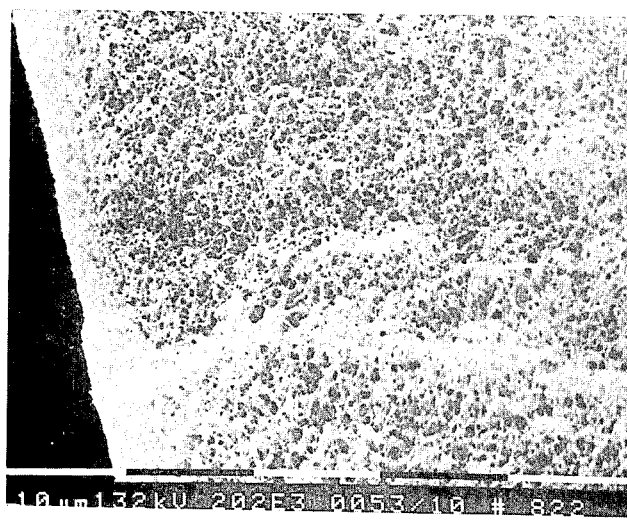
Figure 3D:
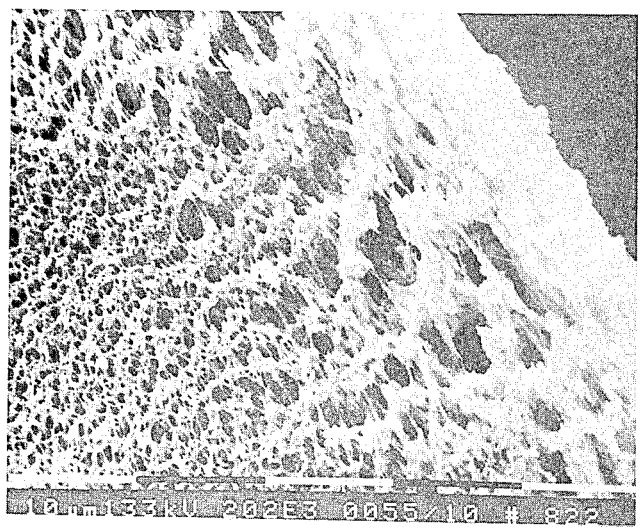

Under certain chill roll temperature conditions and polymer concentrations like the ones employed when producing the 0.2 micron rated polypropylene membrane, a skin having an apparent density much lower than that of the remainder of the membrane can be formed (compare FIG. 3B).

The membranes of the present invention are substantially skinless. By the term "substantially skinless", it is meant that the membrane has no more than about 20 percent of its cross-section occupied by a skin layer. Preferably, the skin layer occupies no more than 10 percent of the cross-section, and most preferably, less than 5 percent.

If the chill roll temperature is too warm, proper solidification may not occur in time to remove a solidified sheet from the layer on a continuous basis. Also, as stated, a warm chill roll will result in a slower cooling rate and possibly too large of a pore diameter.

From Table I it is apparent that acceptable membranes were produced except for run D having a thickness of 7.4 mils, which had low flow characteristics.

TABLE I

|   | TREATED | CHILL ROLL (°C.) | THICKNESS (mils) | MAXIMUM PORE (micron) | N$_2$ FLOW (l/min/cm$^2$) | H$_2$O FLOW (ml/min/cm$^2$) | BURST STRENGTH (psi) |
|---|---|---|---|---|---|---|---|
| A | yes | 70 | 3.3 | 0.31 | 0.94 | 6.5 | 14.5 |
| B | yes | 70 | 3.3 | 0.31 | 0.92 | 6.2 | 15.1 |
| C | yes | 70 | 3.4 | 0.33 | 0.84 | 6.3 | 16.3 |
| D | no | 55 | 7.4 | 0.34 | 0.42 | 3.1 | 22.7 |
| E | no | 62 | 6.5 | 0.35 | 0.51 | 3.7 | 22.4 |
| F | no | 70 | 6.8 | 0.37 | 0.51 | 3.9 | 23.6 |
| G | yes | 70 | 3.5 | 0.34 | 0.74 | 5.0 | 17.2 |
| H | yes | 70 | 3.4 | 0.34 | 0.77 | 5.0 | 15.9 |
| I | yes | 70 | 3.3 | 0.34 | 0.90 | 5.8 | 15.0 |
| J | no | 73 | 3.2 | 0.34 | 1.10 | 8.3 | 12.0 |

The thickness of the membrane, of course, affects the flow rate properties of the membrane, the thicker the membrane, the lower the flow rate, but having a thin membrane can result in a membrane having poor mechanical properties, such as a low burst strength.

The membrane of the present invention may be used for various applications, such as microfiltration. A totally surprising advantage is when the membrane of the present invention is used to remove pyrogens from water or an aqueous solution containing said pyrogens, as at a concentration of from about 0.1 to about 50 ng/ml. It has been found that when such water or solution is placed in contact with a feedside of a membrane of the present invention, is passed therethrough, and recovered, the amount of pyrogens which can be removed with the membrane of the present invention is at least 10 times, and even 100 times or greater, the amount of pyrogens which can be removed by a prior art 0.2 micron polypropylene membrane.

The present invention will be described in further detail by the following nonlimiting examples.

EXAMPLE I

Using an apparatus as described in FIG. 1, the process as described above was employed utilizing 30 percent, by weight, of Phillips BP-145, MFR-9.5 as the polypropylene powder and 70 percent, by weight, of Armostat 310 as the amine. The chill roll temperature was varied from about 55° to about 73° C. and was rotated at a surface speed of 15 feet per minute, allowing a film contact length on the chill roll of 18 inches. The film thickness was varied from about 3.2 to about 7.4 mils. Some of the samples were treated in a bath of the amine, after film formation, as described above. Details concerning the final membrane properties are contained in Table I.

EXAMPLE II

Sometimes it is necessary to install a wiper bar on the chill roll at a location just prior to the casting box. Such a wiper bar can be constructed of cloth, rubber, or other suitable material and functions to reduce the thickness of any amine layer on the chill roll and to make it more uniform in thickness, thus also somewhat modifying the heat transfer between the chill roll and film.

Employing various wiper bars, the procedure of Example I was followed using a chill roll temperature of 60° C., making membranes having a thickness from about 3.3 to about 4.0 mils. The properties of the resulting membranes, shown as averages based upon ten determinations, are included in Table II.

From Table II it is apparent that the construction of and use of the wiper bar has an impact on the characteristics of the resultant membrane.

TABLE II

|   | WIPER BAR | THICKNESS (mils) | BUBBLE POINT (psi) | MAXIMUM PORE (micron) | N$_2$ FLOW (l/cm$^2$/min) | BURST STRENGTH (psi) |
|---|---|---|---|---|---|---|
| A | cloth | 3.7 | 34.3 | 0.27 | 0.81 | 15.2 |
| B | none | 3.4 | 33.0 | 0.27 | 0.87 | 14.7 |
| C | cloth | 3.8 | 32.2 | 0.28 | 0.78 | 15.2 |
| D | cloth | 3.7 | 33.2 | 0.27 | 0.80 | 14.7 |
| E | cloth | 3.8 | 29.4 | 0.31 | 0.73 | 15.6 |
| F | cloth | 4.0 | 30.9 | 0.29 | 0.75 | 16.2 |
| G | cloth | 3.7 | 30.6 | 0.30 | 0.83 | 16.0 |
| H | rubber | 3.8 | 46.0 | 0.20 | 0.56 | 16.4 |
| I | rubber | 3.5 | 49.9 | 0.18 | 0.56 | 15.7 |
| J | rubber | 3.3 | 44.1 | 0.21 | 0.75 | 14.2 |
| K | cloth | 3.6 | 30.7 | 0.30 | 0.83 | 14.7 |

EXAMPLE III

Figure 4:
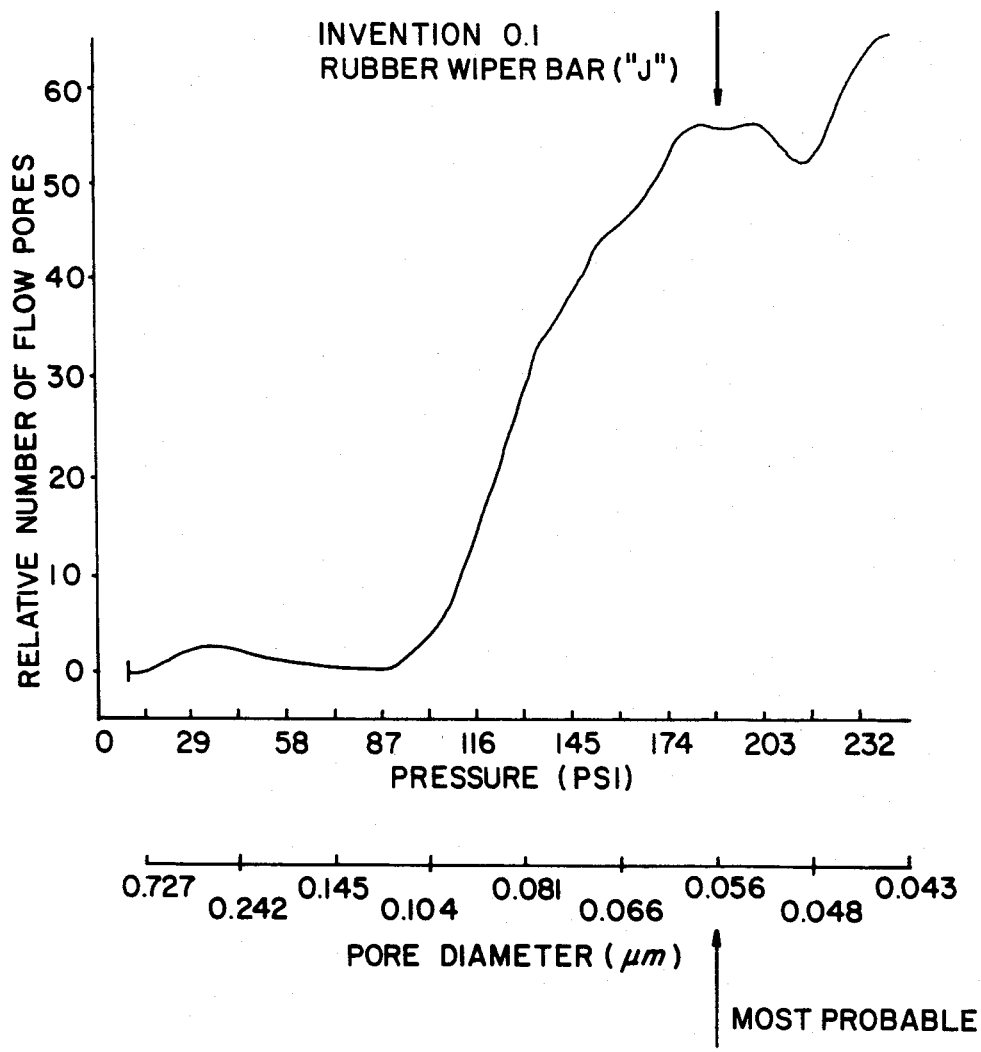
FIG. 4 is a curve obtained from analyzing a membrane from Example II (Table II, Sample J) on an automatic pore-size distribution analyzer.
Figure 5:
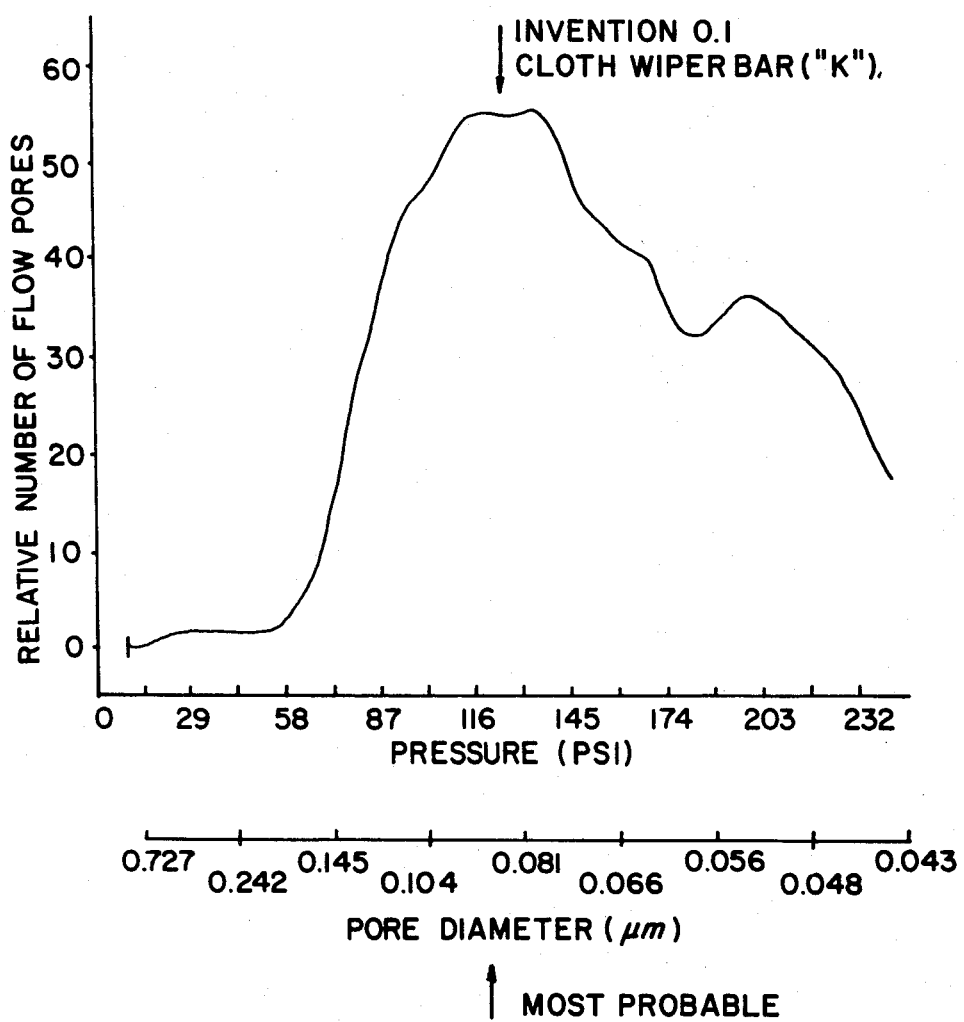
FIG. 5 is a curve obtained from analyzing a membrane from Example II (Table II, Sample K) on an automatic pore-size distribution analyzer.
Figure 6:
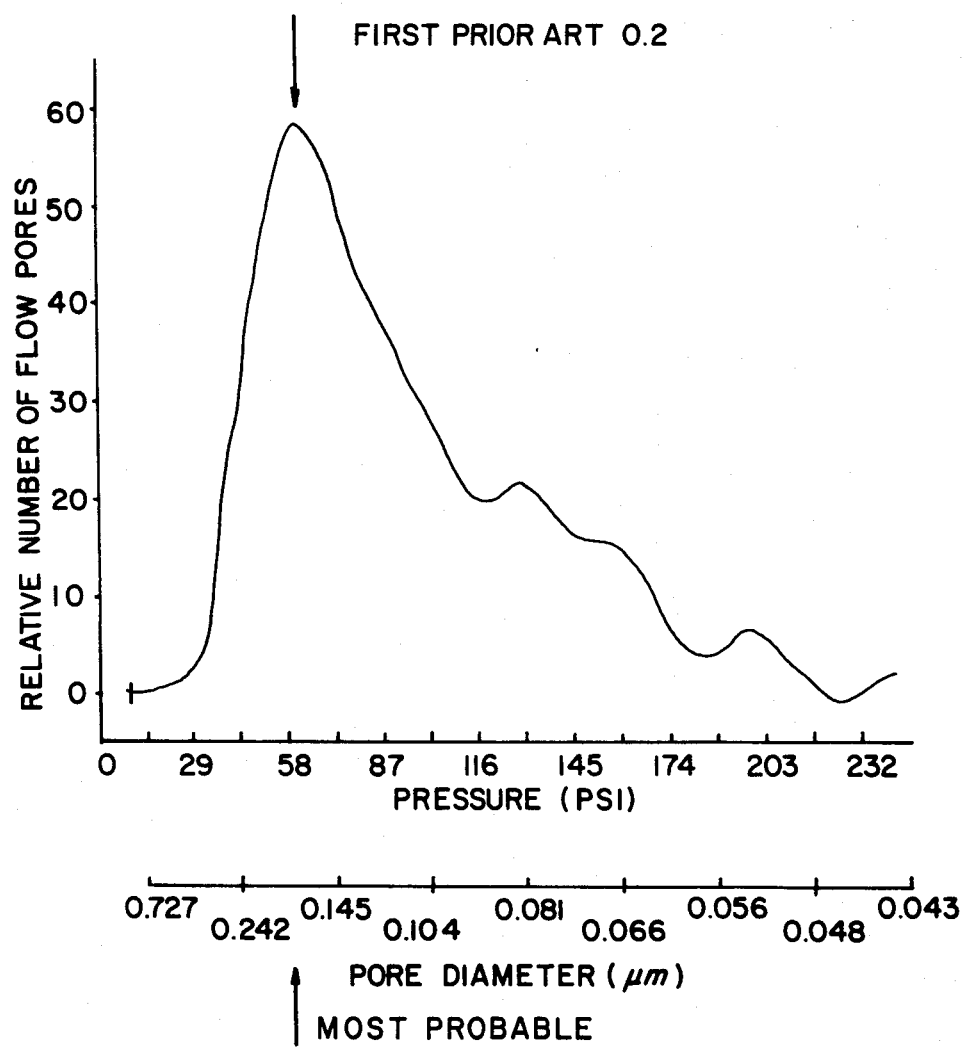
FIG. 6 is a curve obtained from analyzing the first prior art 0.2 micron polypropylene membrane (Table III) on an automatic pore-size distribution analyzer.
Figure 13:
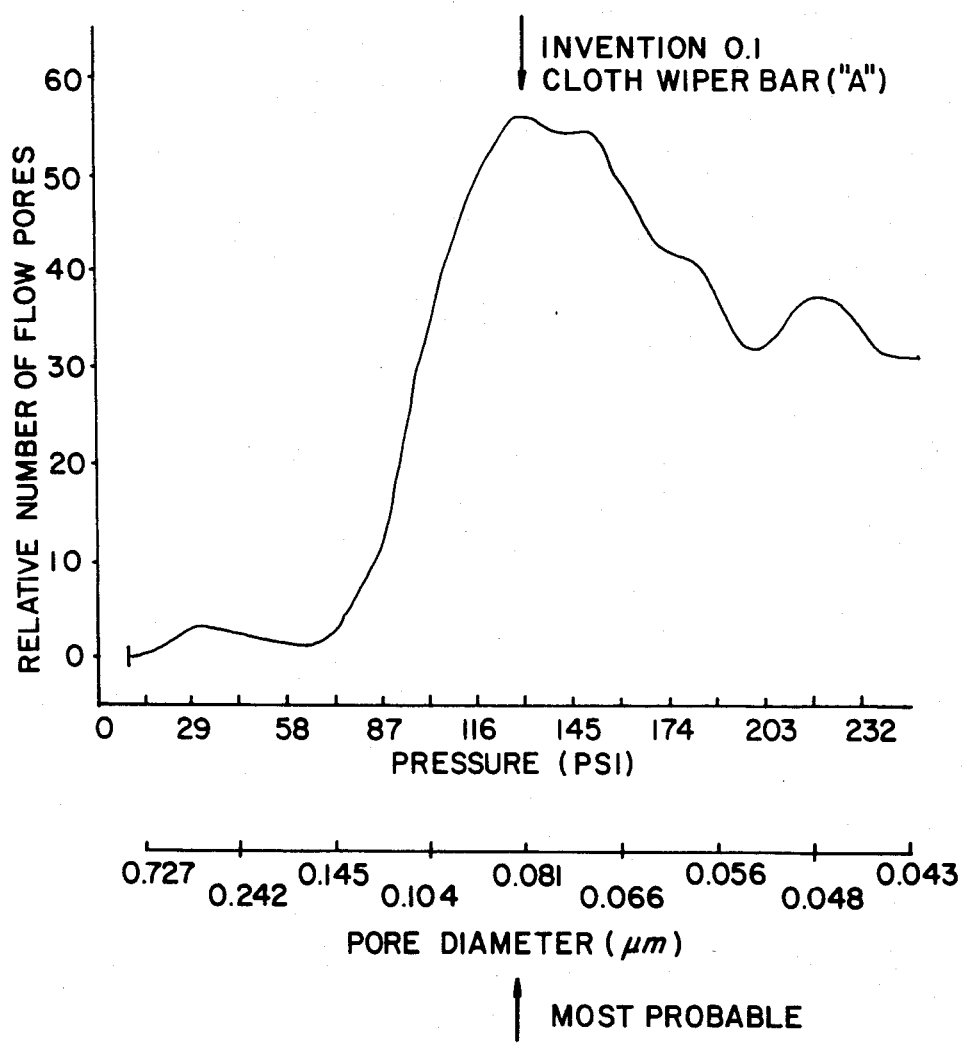
FIG. 13 is a curve obtained from analyzing a membrane from Example II (Table II, Sample A) on an automatic pore-size distribution analyzer.
Figure 14:
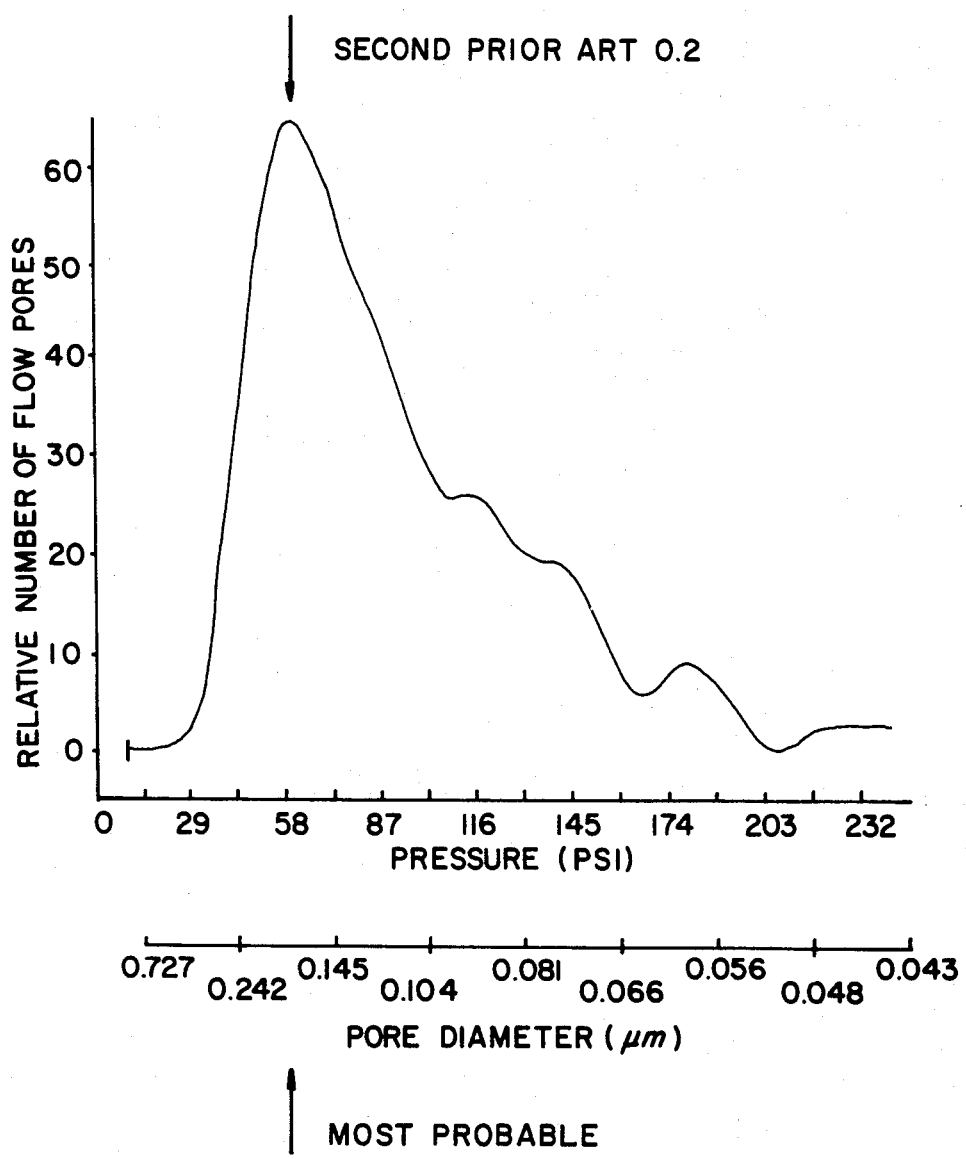
FIG. 14 is a curve obtained from analyzing the second prior art 0.2 micron polypropylene membrane (Table III) on an automatic pore-size distribution analyzer.
Figure 15:
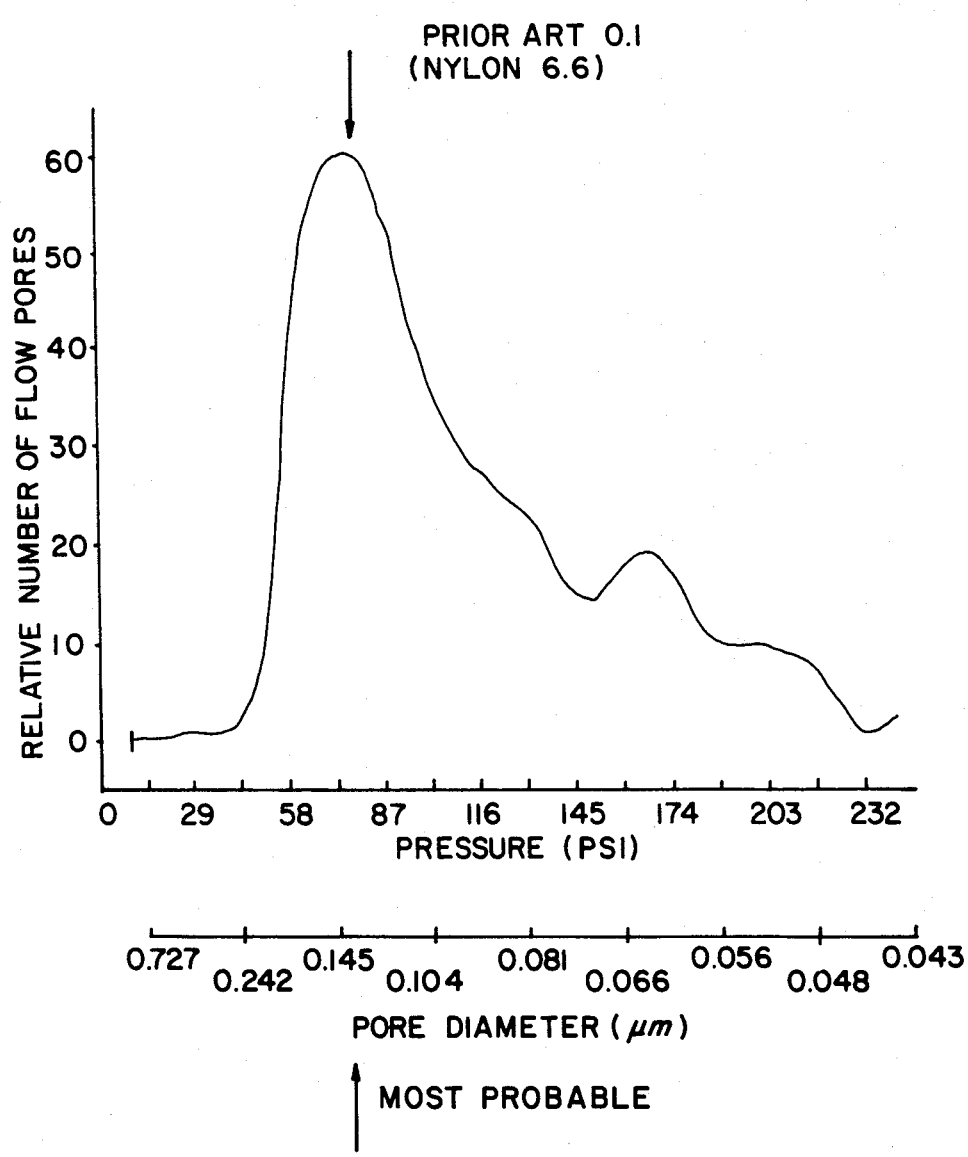
FIG. 15 is a curve obtained from analyzing a prior art 0.1 micron nylon 6,6 membrane on an automatic pore-size distribution analyzer.
Figure 16:
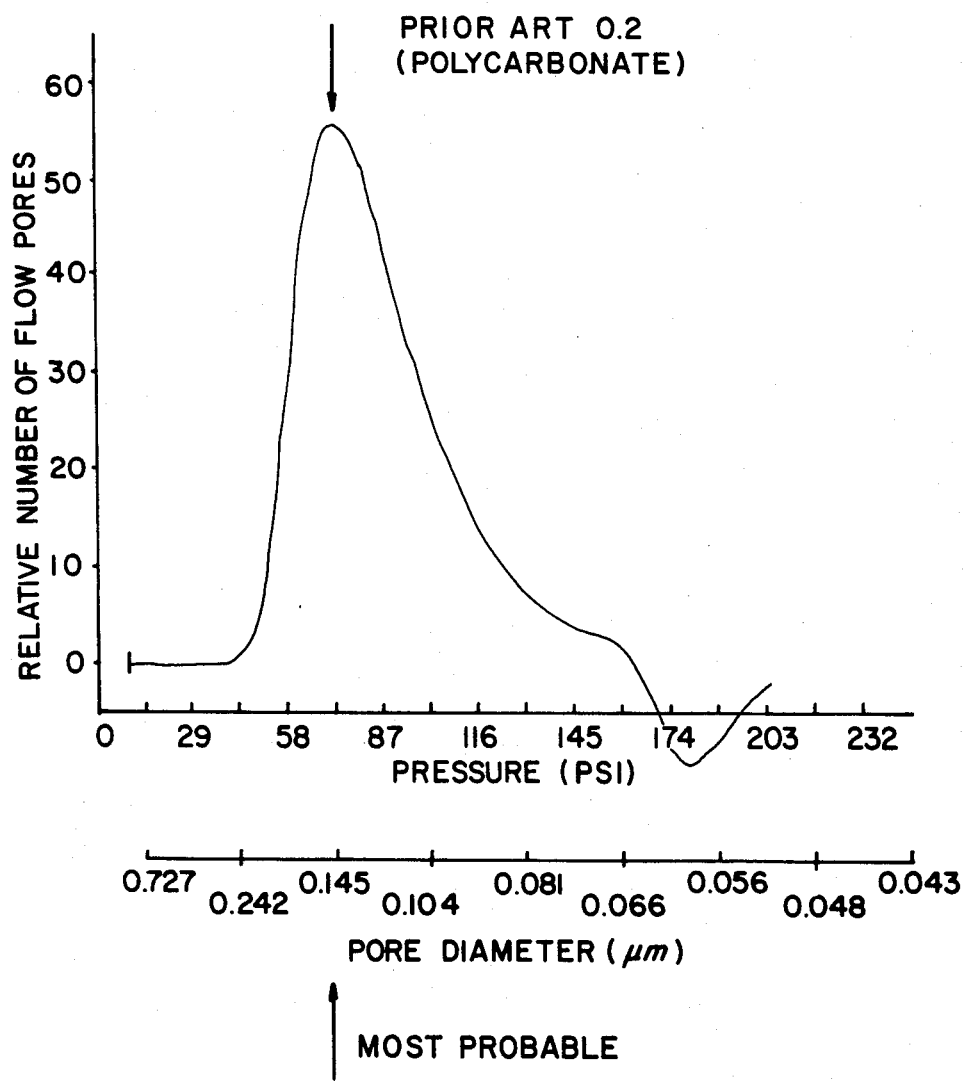
FIG. 16 is a curve obtained from analyzing a prior art 0.2 micron polycarbonate membrane on an automatic pore-size distribution analyzer.

A membrane of the present invention described as "J" in Table II, produced in accordance with the procedure of Example II, employing a rubber wiper bar, was subjected to pore-size analysis on the pore size distribution analyzer, as discussed above. The results of said analysis are shown in FIG. 4. In FIG. 5 there are shown the results of the same analysis done on the membrane described as "K" in Table II, produced in accordance with the procedures of Example II, employing a cloth wiper bar. FIG. 6 shows the same analysis performed on a prior art 0.2 micron polypropylene membrane, as does FIG. 14 on another prior art membrane. Finally, FIG. 13 shows the pore-size distribution analyzer curve for a membrane of the present invention described as "A" in Table II, produced in accordance with the procedure of Example II, employing a cloth wiper bar.

The analytically derived results for FIGS. 4, 5, 6, 13, and 14, as well as other membrane properties are summarized in Table III.

TABLE III

| EXAMPLE II TABLE II | MEMBRANE TYPE AND NOMINAL PORE SIZE (micron) | N$_2$ FLOW (l/min/cm$^2$) | MAXIMUM PORE FROM BUBBLE POINT (micron) | MOST PROBABLE PORE DIAMETER** (micron) | MEDIAN PORE DIAMETER FROM APSDA* (micron) | MEAN PORE DIAMETER FROM MERCURY INTRUSION | SHARPNESS FACTOR FROM MERCURY INTRUSION |
|---|---|---|---|---|---|---|---|
| | Prior Art 0.2 | 1.02 | 0.5 | 0.17 | 0.13 | | |
| | Prior Art 0.2 | 1.04 | 0.54 | 0.18 | 0.14 | 0.10 | 9.7 |
| "J" | Invention 0.1, Rubber Wiper Bar | 0.75 | 0.2 | 0.06 | 0.06 | | |
| "K" | Invention 0.1 Cloth Wiper Bar | 0.83 | 0.3 | 0.09 | 0.08 | | |
| "A" | Invention 0.1 Cloth Wiper Bar | 0.81 | 0.27 | 0.08 | 0.07 | 0.11 | 11.3 |
| | Prior Art 0.1 (nylon 6,6) | 0.65 | 0.32 | 0.14 | 0.11 | 0.18 | 2.1 |
| | Prior Art 0.2 (polycarbonate) | 2.66 | 0.64 | 0.14 | 0.13 | | |

*APSDA stands for Automatic Pore Size Distribution Analyzer.
**Pore diameter at the maximum of the distribution curve from APSDA.

COMPARATIVE EXAMPLE

Figure 2B:
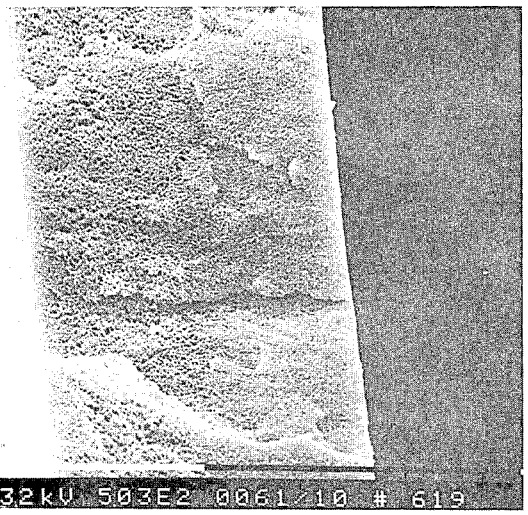
Figure 2C:
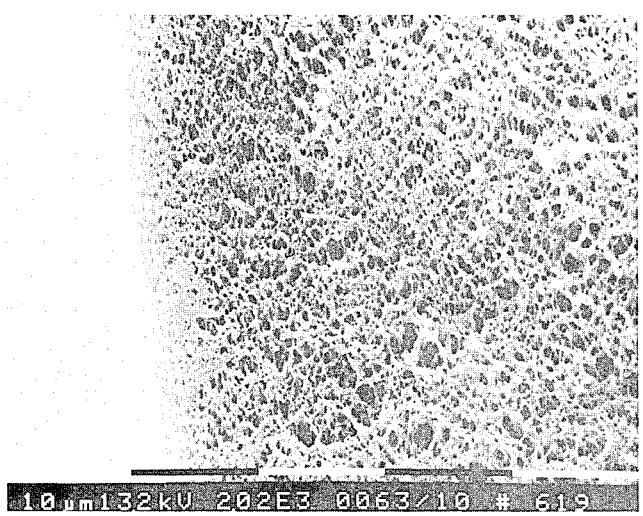
Figure 2D:
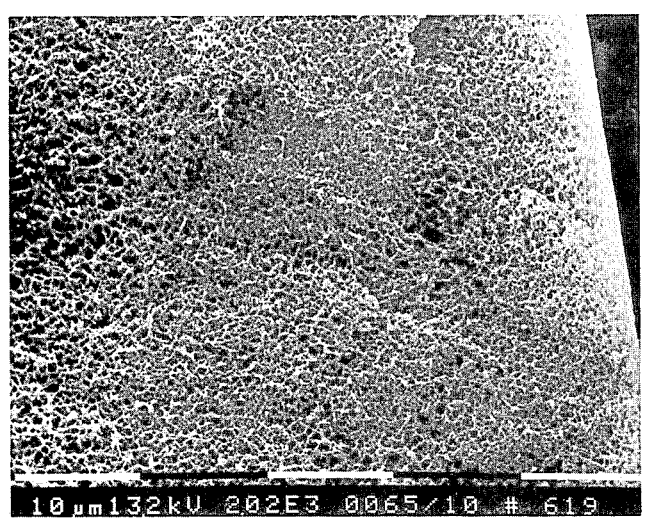
Figure 11A:
FIGS. 11A, B, and C are scanning electron photomicrographs of a membrane (comparative example, Table IV) not made in accordance with the present invention at magnifications of 500, 2,000, and 2,000, respectively.
Figure 11B:
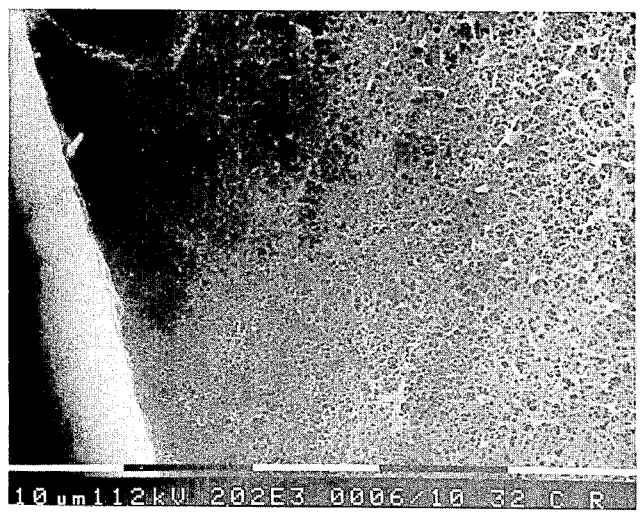
Figure 11C:
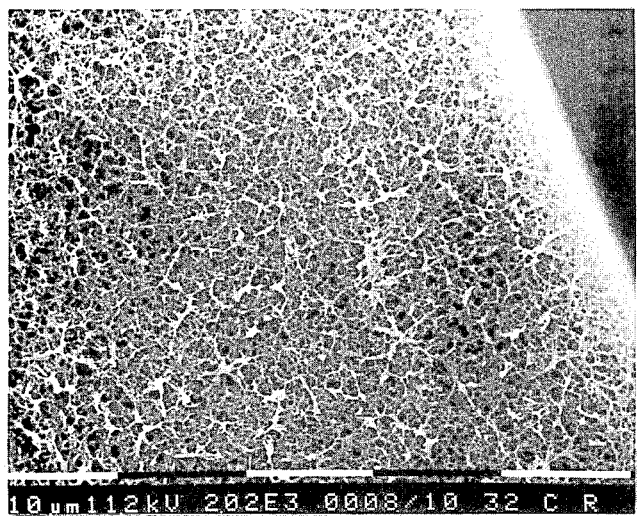
Figure 12A:
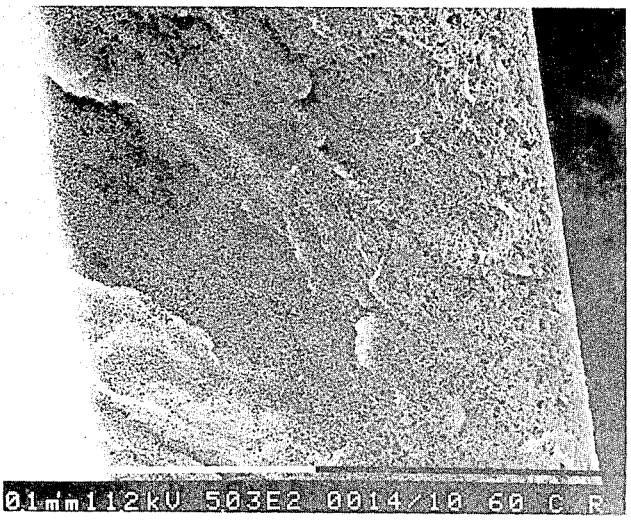
FIGS. 12A, B, and C are scanning electron photomicrographs of a membrane (comparative example, Table IV) not made in accordance with the present invention at a magnifications of 500, 2,000, and 2,000, respectively.
Figure 12B:
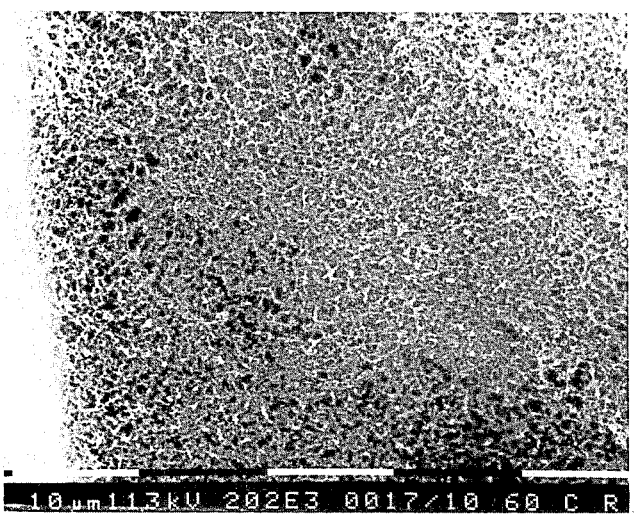
Figure 12C:
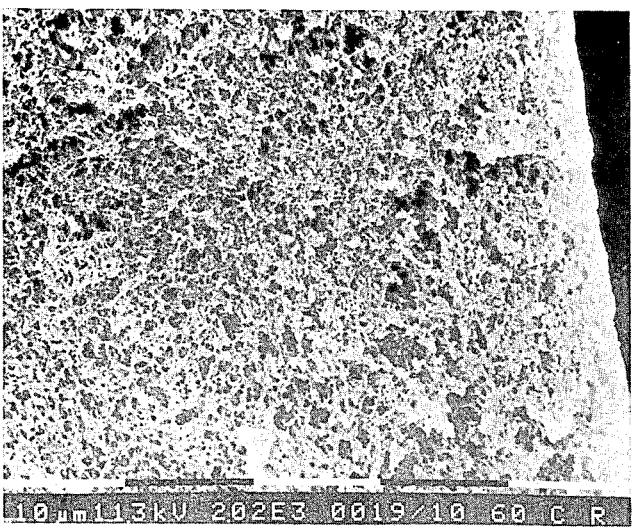

To demonstrate that the limitations of the present invention are critical, especially with respect to the polymer: amine ratio and chill roll temperature used to manufacture the membranes of the present invention, the general process of Example I was modified to use a smaller amount of resin, changing the amount of resin to 25 percent by weight, and the amount of amine to 75 percent by weight. Two chill roll temperatures, 32° C. and 60° C. were employed. The sample made with the 60° C. chill roll temperature was treated in a bath of heated amine, as described in the general procedure above. The results obtained are shown in Table IV which demonstrate that the maximum pore-size obtained was in the case of the 60° C. chill roll temperature too large, as the bubble point was below 25 psi. In the case of the 32° C. chill roll temperature, the nitrogen flow was too low. Also, the membranes which were obtained possessed a large area of skin, as shown in FIGS. 11A, B, and C for the 32° C. chill roll temperature sample (higher density skin), and in FIGS. 12A, B, and C for the 60° C. chill roll temperature sample (lower density skin), which are scanning electron photomicrographs of the cross-section of the membranes. The foregoing can be contrasted with FIGS. 2B, C, and D which are similar photomicrographs of a membrane produced in accordance with the present invention, showing substantially no skin formation. FIGS. 3B, C, and D are photomicrographs of a cross-section of a prior art 0.2 micron membrane, also demonstrating the presence of a substantial skin layer (lower density skin).

TABLE IV

| CHILL ROLL TEMPERATURE (°C.) | THICKNESS (mils) | BUBBLE POINT (psi) | MAXIMUM PORE (micron) | N$_2$ FLOW (l/cm$^2$/min) | BURST (psi) |
|---|---|---|---|---|---|
| 32 | 6.5 | 41.8 | 0.22 | 0.42 | 14.6 |
| 60 | 6.0 | 19.0 | 0.47 | 0.84 | 17.4 |

What is claimed is:

1. A substantially skinless microporous polypropylene membrane characterized by having (a) a bubble point of about 25 to about 50 psi;
(b) a thickness of about 3 to about 7 mils;
(c) a nitrogen flow rate of at least 0.5 liters per square centimeter-minute;
(d) a burst strength of at least 10 psi; and
(e) an S value of about 15, or less.

2. The membrane of claim 1 having a skin throughout no more than 10 percent of its cross-section.

3. The membrane of claim 1 having a thickness of about 3.5 to about 4.0 mils.

4. The membrane of claim 1 having a flow rate of at least 0.7 liters per square centimeter-minute.

5. The membrane of claim 4 having a skin throughout less than 5 percent of its cross-section, having a thickness of about 3.5 to about 4.0 mils, and having a sharpness value of from about 8 to about 14.

6. The membrane of claim 1 having a sharpness value of from about 8 to about 14.

7. A method of preparing a substantially skinless microporous polypropylene membrane comprising heating a mixture of about 30 percent polypropylene and about 70 percent, N,N-bis(2-hydroxyethyl)tallowamine, by weight, to a temperature and for a time sufficient to form a homogeneous solution, casting or extruding said solution at a thickness of about 3 to about 7 mils, onto a chill roll maintained at a temperature of from about 50 to about 80° C., allowing said solution to solidify on said chill roll to form a solid sheet, removing said solid sheet from said chill roll and removing at least a substantial portion of the amine from said sheet to form the microporous polypropylene membrane.

8. The method of claim 7 wherein the solution is cast at a thickness of about 3.5 to about 4 mils.

9. The method of claim 7 wherein the chill roll temperature is about 60° C.

10. The method of claim 7 wherein the amine is removed with isopropanol.

11. The method of claim 10 wherein a wiper bar is used on the chill roll, prior to a casting box.

* * * * *